United States Patent

[11] 3,556,167

[72] Inventor Charles R. Nippert, Sr.
Allentown, Pa.
[22] Filed Sept. 19, 1967
[45] Patented Jan. 19, 1971
[73] Assignee Bethlehem Steel Corporation
a corporation of Delaware

[54] APPARATUS AND METHOD FOR MEASURING STRAND
8 Claims, 3 Drawing Figs.

[52] U.S. Cl.................................................. 140/1,
29/417, 73/160, 226/109
[51] Int. Cl..................................................... B21f 11/00
[50] Field of Search........................................... 140/1, 140,
71; 29/417, 419; 72/275; 161/172, 175, 176;
73/159, 160; 33/133, 134; 226/109; 83/208, 369, 522

[56] References Cited
UNITED STATES PATENTS

| | | | |
|---|---|---|---|
| 757,810 | 4/1904 | Hudson | 33/134 |
| 1,169,130 | 1/1916 | Curtis | 33/134 |
| 1,493,855 | 5/1924 | Garnett | 33/134 |
| 2,929,136 | 3/1960 | Andren | 29/417 |
| 2,947,652 | 8/1960 | Burr | 140/1 |

*Primary Examiner*—Lowell A. Larson
*Attorney*—Joseph J. O'Keefe

ABSTRACT: Wire strand is fabricated and subsequently severed into measured lengths of strand at locations determined on a wire of the strand during fabrication by passing the wire between rearwardly urged tension rolls, around a measuring wheel, and between unidirectional tension rolls.

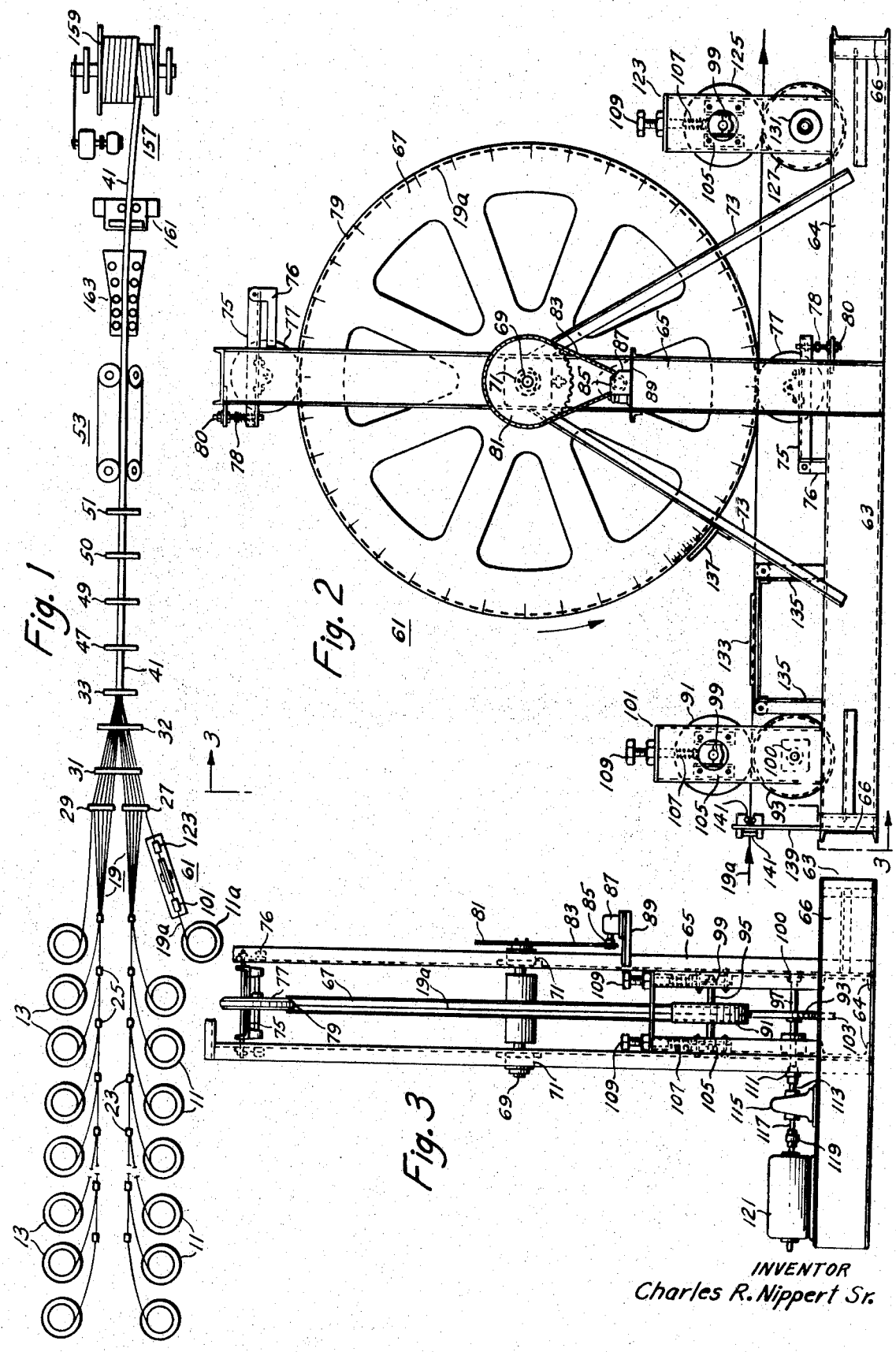
PATENTED JAN 19 1971     3,556,167
INVENTOR
Charles R. Nippert Sr.

APPARATUS AND METHOD FOR MEASURING STRAND

CROSS-REFERENCES TO RELATED APPLICATIONS

The measuring method and device of the instant invention is particularly suitable for, but not limited to, use with the method and apparatus for making parallel wire strand shown and described in application for U.S. Letters Pat. Ser. No. 575,038 filed Aug. 25, 1966 by J.L. Durkee et al.

BACKGROUND OF THE INVENTION

This invention pertains to the measurement of wire, and strand into which the wire is fabricated, with a very high accuracy.

It has in the past been a problem to obtain highly accurate measurement of wire with the measuring devices available. A number of variations of these devices have been made based upon counting by suitable counting mechanisms of the revolutions of two rolls between which the wire is passed. These devices have not proved highly accurate, largely, it is believed, because of slippage of the wires. The slippage problem has been alleviated in some cases by passing the wire completely around the periphery of a measuring wheel in order to obtain more frictional surface contact but the accuracy of such devices has still left much to be desired.

In the past it has also been the custom to measure a strand directly by means of devices much like those used in measuring wire. During the stranding of twisted cable, for instance, the length of cable fabricated is customarily determined by a counting device connected to the drawing capstan. Such an arrangement is unsatisfactory when accurate lengths of strand are to be fabricated particularly in the fabrication of parallel wire strand as described in the above noted application of Durkee et al. Where the finished strand must be accurate within very narrow tolerances if it is to hang correctly between bridge towers and the like. It has been necessary in such cases to resort to direct measurement of the finished strand with a tape or similar means due to the inaccuracy of previously available continuous measuring devices and also because the binding on the outside of the finished parallel wire strand precludes an accurate measurement of length by roller contact along the surface of the strand. In order to obtain an accurate mean measurement, however, the strand must be placed under a minimum tension while the measurement is being made, the required tension often approaching several thousand pounds and requiring special apparatus for its application.

SUMMARY OF THE INVENTION

This invention provides an improved apparatus and method for measuring wire and strand by passing the wire about a measuring wheel arranged in combination with a constant tension rearwardly urged pair of tension rolls between which the wire initially passes, and a second pair of unidirectional tension rolls between which the wire passes after it leaves the measuring wheel. During the fabrication of strand, one of the wires of the strand is measured by the measuring device and marked prior to fabrication into strand whereby the strand may be severed into predetermined accurate lengths after fabrication by cutting the strand at the marks on the wire.

BRIEF DESCRIPTION OF THE DRAWINGS

FIG. 1 shows a plan view of a strand producing apparatus embodying the present invention.

FIG. 2 shows an elevation of the measuring device of the present invention.

FIG. 3 is an end elevation along 3—3 of FIG. 2.

DESCRIPTION OF THE PREFERRED EMBODIMENT

FIG. 1 shows a layout of the fabrication of parallel wire strand. A plurality of swifts 11 and 13 are arranged to direct a series of wires 19 through a series of guides 23 and 25 to lay plates 27, 29, 31 and 32 which direct the wires to a series of roller-compacting dies 33, 47, 49, 50 and 51 between which the resulting parallel wire strand 41 is wrapped at intervals with a suitable tape of or other binding means to hold the wires of the parallel wire strand together. A suitable pulling device 53, here shown as a catapuller-type capstan, pulls the wires 19 from the swifts 11 and 13 through the lay plates 27, 29, 31 and 32 and compacting dies 33, 47, 49, 50 and 51 and passes the finished strand 41 along a roller conveyor 163 and through traverse 161 to reeling device 157 where it is reeled on a reel 159. One of the swifts 11 designated as 11a is displaced slightly to the side to allow the measuring device 61 of the present invention to be positioned along the path of the wire 19a from swift 11a to lay plate 27. Swifts 11 and 13 will include braking devices, not shown, designed to place a back tension of approximately 25 to 30 pounds on the wires 19.

Measuring device 61 shown in detail in FIGS. 2 and 3 comprises a base 63, comprising longitudinal members 64 and transverse members 66, upon which are mounted vertical support members 65 for large measuring wheel 67 approximately six feet in diameter mounted on a shaft 69 rotatably journaled in bearings 71 mounted on support members 65. Braces 73 aid in rigidly tying support members 65 to base 63. Hinged members 75 pivoted on brackets 76 serve as adjustable mountings for pressure rolls 77 which are urged against the bottom of a flat bottomed V-groove 79 in the periphery of measuring wheel 67 by the action of spring 78 and compression adjustment 80. A gear 81 is secured to shaft 69 and is operatively connected by a chain 83 to a small gear 85 attached to the shaft of a mechanical counter mechanism 87 mounted on a bracket 89.

A pair of tension rollers 91 and 93 are mounted on shafts 95 and 97 journaled in bearings 99 and 100 mounted on supporting structure 101 at the left end of base 63 as viewed in FIG. 2. Tension roller 93 has a shallow groove 103 in the periphery. Bearings 99 are slidably mounted in slideways 105 mounted on supporting structure 101 so that roll 91 may be urged against the periphery of roll 93 by the action of springs 107 the compression of which may be adjusted by screws 109. Shaft 97 is connected by coupling 111 to the output shaft 113 of gear reducer 115 the input shaft 117 of which is connected by coupling 119 to the shaft of an eddy current motor 121 or other motor of a design which may remain stationary or be rotated in a reverse direction without damage.

On the right side of base 63 there is mounted a support assembly 123 with tension rolls 125 and 127 journaled therein in the same operative arrangement as is used to journal tension rolls 91 and 93 in supporting structure 101. Tension roll 125 is slidably mounted to bear against the shallow grooved periphery of tension roll 127 the shaft of which is provided with a one-way clutch mechanism 131 of any suitable design such as a cam clutch or roller clutch which will operate to prevent rotation of roll 127 in a direction other than forward.

A zero index 133 is mounted upon two supports 135 adjacent to the path of the wire from tension rollers 91 and 93 to the periphery of measuring wheel 67. A vernier index 137 is mounted on brace 73 adjacent to the periphery of measuring wheel 67. The periphery of measuring wheel 67 is marked off in intervals of degrees. A wire guide 139 having guide rollers 141 is mounted on base 63 in front of tension rolls 91 and 93 to direct the wire between the rolls.

In operation of the measuring device a wire 19a is threaded through the rollers 141 of guide 139 from swift 11a and between tension rolls 91 and 93, across the face of zero index 133, about the periphery of measuring wheel 67 for one turn and then between the tension rollers 125 and 127 to a primary pulling apparatus such as catapuller 53 shown in FIG. 1. After the wire has been threaded between tension rolls 125 and 127 so that it cannot be pulled back due to the one-way clutch mechanism 131, eddy current motor 121 is activated to place a constant rearward tension upon the wire of approximately 25 pounds or the like depending upon the wire characteristics.

A mark is placed on the wire adjacent to the zero index and the counter, which may preferably be a simple revolution counter, is set at zero and the degree mark adjacent to a given index point on the vernier index is noted. The measuring wheel will previously have been calibrated for the particular gage wire which is to be measured so that it is known how much wire is passed through the device by one revolution of the measuring wheel. The wires 19, including the wire 19a which is pulled against the back tension of eddy current motor 121, are then pulled through the apparatus until counter 87 indicates that the desired length of wire has passed the measuring wheel as determined by the required number of revolutions of the measuring wheel 67 plus the number of extra degrees and parts of degrees of revolution over the required number of complete revolutions read opposite the primary vernier mark on the wheel and on the vernier scale respectively. Preferably the gear ratio between gear 81 and small gear 85 on the counter is sufficiently great so that one revolution of the measuring wheel 67 will result in a number of revolutions of the counter. The reading on the counter is checked by the vernier indicator. The actual length of wire passing around the measuring wheel during each revolution depends upon the gage of wire being measured as well as the circumference of the measuring wheel. The wheel may be conveniently calibrated by actually measuring a predetermined length of wire with the measuring apparatus. With careful calibration it has been possible to obtain consistent wire measurements with less than one inch of error in lengths of wire of over 4000 feet— —that is less than .002 percent error—with little difficulty.

When used to measure a wire strand the measuring apparatus 61 of the present invention is placed between the swift from which one of the wires is taken as shown in FIG. 1 and the wire compacting die 33. In a parallel wire strand having a regular geometrical section such as described in the above mentioned Durkee et al. application the wire to be measured is preferably one of the outside corner wires of the geometrical section. The measured wire is pulled with all the remaining wires by the pulling device 53 through the various lay plates and the compacting dies 33, 47, 49, 50 and 51 and together with the other wires is bound at intervals either by hand or by suitable mechanical binding means between the various compacting dies as the strand is pulled forward. The strand is passed onto a reel 159 after passing through the pulling device 53. It will bee understood that in some applications the reeling device 157 might itself constitute the primary pulling device.

Upon first starting the strand-fabricating operation, after the various wires 19 are entered into all the various apparatus wire 19a is preferably painted with yellow quick drying paint in the area of the zero index 133. A thin pencil or other suitable mark is then made on the painted area at the zero reference point of the zero index 133 and any desirable desirable marks such as a mark to indicate the correct position of the end socket on parallel wire bridge strand may also be made at this time. The counting device 87 is either set to zero or its reading is taken, and the exact position of the measuring wheel 67 with reference to the vernier index 137 is noted. The pulling device 53 is then operated to pull the various wires 19 through the apparatus until the reading on the counter mechanism 87 and the vernier index reading indicate that the desired predetermined amount of wire has been passed through the measuring device 61. The movement of the wire through the apparatus is then interrupted and a section of the wire adjacent the zero index is again painted and a mark made at the zero reference point, plus whatever other marks may be desired. The operation of the pulling device is then resumed and may be continued until the counter and the vernier index reading indicate that another predetermined amount of wire has passed through the measuring device 61 and another zero reference mark can be made. This operation is continued until the required number of lengths of strand are fabricated and marked. The strand may be severed into precise predetermined lengths by cutting through the entire strand with a suitable severing means such as an abrasive cutting wheel at the zero reference marks on wire 19a any time after the marked wire is incorporated into the finished strand either before reeling or after reeling and unreeling.

Since a single wire can be more accurately measured by roller contact than most if not all strands composed of a plurality of wires, the method of the present invention of marking the one wire prior to its incorporation into a strand and then cutting the completed strand into precise lengths according to the marks on the wire provides a superior method of measurement during continuous operation as well as extreme accuracy. A single wire furthermore may be measured with great accuracy without the application of the relatively high tension necessary to measure a strand accurately. If desired, two identical measuring devices may be used to measure two adjacent outside wires of the strand as a check. Any possible discrepancy in the marks would indicate to the operators of the strand making line that the particular length of strand should be carefully checked by hand measurement. Such checking is very rarely if ever necessary with the disclosed apparatus, however.

The described method and apparatus of measurement have a further advantage in the making of strand in which it is desirable to mark the location of other structures upon the strand. For instance in the making of parallel wire bridge suspension strand the future location of the saddles over which the strand is supported on the bridge is also marked on the strand and as it is desirable not to have any wire splices in the area of the saddle, by marking this area on the wires before the strand is compacted it is possible to remove any splices which may happen to be located in the wires in these areas by cutting out this section of wire and pulling fresh wire forward from the appropriate swift to take its place. It will be understood that it would be very difficult to remove a splice once it is incorporated into a finished strand if measurement of the strand was delayed until the particular length of strand is completed.

Obviously the measuring device could also be used to directly measure not only wire but other lineal material such as small twisted cable or rope. In the claims therefore the term wire is intended to encompass such structures.

I claim:

1. In a method for making wire strand comprising drawing a plurality of wires from a plurality of reel means and through die means to form a parallel wire strand the improvement facilitating the making of an accurate length of strand comprising:
   a. passing at least one but less than all of said plurality of wires from said reel means to said die means through a roller measuring means incorporating a counter;
   b. taking a zero reading on said counter and making a first mark on the wire at a point having a predetermined position at the time of marking with respect to a zero index associated with said measuring device;
   c. drawing the wire through the device while simultaneously operating said counter until the predetermined desired length of wire is counted off;
   d. making a second mark on the previously marked wire at a point having a predetermined position with respect to said zero index;
   e. continuing to draw said plurality of wires through said die means until the said second mark has passed therethrough; and
   f. subsequent to securing said wires together to prevent disruption of said parallel wire strand severing said strand at locations adjacent said first and second marks on said marked wires.

2. The method of making wire strand according to claim 1 additionally comprising counting the gross revolutions of said measuring wheel with said counter and the fine increments of revolution with a vernier index mounted adjacent to the measuring wheel.

3. The method of making wire strand according to claim 1 wherein less than a majority of the wires of the strand are measured and additionally comprising:

g. drawing said wires through said die means in parallel relation to each other and afterward binding into a parallel wire strand by binding at intervals with a suitable binding means.

4. The method of making wire strand according to claim 3 additionally comprising:

h. forming said parallel wire strand into a regular geometrical cross section and measuring and marking at least one of the wires which is to be a corner wire in the completed cross section.

5. Apparatus for making parallel wire strand comprising:
a. a plurality of swifts;
b. die-compacting means;
c. a pulling means to pull a plurality of wires from said plurality of swifts through said die compacting means in parallel relationship;
d. means to facilitate binding said wires in said parallel relationship;
e. a measuring wheel positioned between one of said plurality of swifts and said die-compacting means adapted for passage of wire therearound in frictional relationship;
f. first double tension roll means positioned between said swift and said measuring wheel adapted for passage one of said wires between said rolls of frictional contact therewith;
g. means to urge rotation of the rolls of the first double tension roll means in a direction opposing passage of the wire;
h. second double tension roll means between said measuring wheel and said die-compacting means adapted for passage of said wire between said rolls in frictional contact therewith, and
i. means to allow the rolls of said second tension roll means to rotate only in a direction allowing passage of said wire therebetween toward said compacting die means.

6. A method of making parallel wire strand comprising:
a. providing a plurality of wires of indefinite length;
b. measuring one of said plurality of indefinite length wires and marking thereon a length corresponding to a desired length of parallel wire strand;
c. arranging and binding said plurality of wires together in the form of a parallel wire strand with said marked wire maintained as a surface wire on said strand; and
d. severing said strand at the appropriate marks on said marked wire to form a section of parallel wire strand of the desired accurately predetermined length.

7. A method for measuring and determining the length of a parallel wire strand comprising:
a. providing at least one accurately premeasured standard wire;
b. combining said accurately measured standard wire with a plurality of unmeasured wires into a parallel wire strand; and
c. determining the length of the parallel wire strand with relation to the premeasured standard wire.

8. A method of measuring parallel wire strand according to claim 7 wherein at least two accurately premeasured standard wires are marked with reference marks and additionally comprising:
d. prior to determining the length of said parallel wire strand with relation to the premeasured standard wires checking the accuracy of the measurement of the standard wires by comparison of the premarked reference marks on said two standard wires.